US011053986B2

United States Patent
Fujio et al.

(10) Patent No.: US 11,053,986 B2
(45) Date of Patent: Jul. 6, 2021

(54) FIXED TYPE CONSTANT VELOCITY UNIVERSAL JOINT

(71) Applicant: NTN CORPORATION, Osaka (JP)

(72) Inventors: Teruaki Fujio, Shizuoka (JP); Masashi Funahashi, Shizuoka (JP)

(73) Assignee: NTN CORPORATION, Osaka (JP)

(*) Notice: Subject to any disclaimer, the term of this patent is extended or adjusted under 35 U.S.C. 154(b) by 396 days.

(21) Appl. No.: 16/087,273

(22) PCT Filed: Mar. 9, 2017

(86) PCT No.: PCT/JP2017/009574
§ 371 (c)(1),
(2) Date: Sep. 21, 2018

(87) PCT Pub. No.: WO2017/163914
PCT Pub. Date: Sep. 28, 2017

(65) Prior Publication Data
US 2019/0101167 A1    Apr. 4, 2019

(30) Foreign Application Priority Data
Mar. 25, 2016 (JP) .............................. JP2016-062105

(51) Int. Cl.
*F16D 3/224*    (2011.01)
*F16D 3/2245*   (2011.01)
*F16D 3/223*    (2011.01)

(52) U.S. Cl.
CPC ............ *F16D 3/224* (2013.01); *F16D 3/2245* (2013.01); *F16D 2003/22306* (2013.01); *F16D 2003/22309* (2013.01); *Y10S 464/906* (2013.01)

(58) Field of Classification Search
CPC ................... F16D 3/224; F16D 3/2245; F16D 2003/22306; F16D 2003/22309; Y10S 464/906
(Continued)

(56) References Cited

U.S. PATENT DOCUMENTS 5,531,643 A * 7/1996 Welschof .............. F16D 3/2237
                                                    464/144
2014/0073441 A1* 3/2014 Yamazaki ................ F16D 3/24
(Continued)

FOREIGN PATENT DOCUMENTS

| JP | 2013-104432 | 5/2013 |
| JP | 2014-95404  | 5/2014 |

(Continued)

OTHER PUBLICATIONS

International Preliminary Report on Patentability dated Sep. 25, 2018 in International (PCT) Application No. PCT/JP2017/009574.
(Continued)

*Primary Examiner* — Greg Binda
(74) *Attorney, Agent, or Firm* — Wenderoth, Lind & Ponack, L.L.P.

(57) ABSTRACT

Track grooves of an outer joint member include first and second track groove portions. An end portion of the ball raceway center line of each of the first track groove portions is located on the opening side with respect to a joint center and a ball raceway center line of each of the second track groove portions is connected to the end portion. A ball raceway center line of each of the track grooves of the inner joint member is formed to be mirror-image symmetrical with a ball raceway center line of a corresponding one of the paired track grooves of the outer joint member with respect to a plane that includes the joint center at an operating angle of 0° and is orthogonal to a joint axial line.

4 Claims, 9 Drawing Sheets

(58) Field of Classification Search
USPC .......................................................... 464/144
See application file for complete search history.

(56) References Cited

U.S. PATENT DOCUMENTS

2014/0309045 A1  10/2014  Hirukawa et al.
2015/0072795 A1   3/2015  Hildebrandt et al.

FOREIGN PATENT DOCUMENTS

JP        2015-511694      4/2015
JP           5840463       1/2016

OTHER PUBLICATIONS

Notice of Reasons for Refusal dated Jul. 3, 2020 in corresponding Japanese Patent Application No. 2016-062105, with English Translation.
International Search Report dated Jun. 13, 2017 in International (PCT) Application No. PCT/JP2017/009574.

* cited by examiner

FIXED TYPE CONSTANT VELOCITY UNIVERSAL JOINT

TECHNICAL FIELD

The present invention relates to a fixed type constant velocity universal joint, and more specifically, to a fixed type constant velocity universal joint, which is to be used in a power transmission system of automobiles and various industrial machines, and is configured to allow only angular displacement between two shafts on a driving side and a driven side.

BACKGROUND ART

For example, a plunging type constant velocity universal joint capable of allowing axial displacement while forming an operating angle including a relatively small maximum operating angle is generally assembled on an inboard side (differential side) of an automotive front drive shaft. On an outboard side (wheel side) thereof, a fixed type constant velocity universal joint capable of forming a large operating angle while preventing axial displacement is assembled in consideration of steering of the wheel.

There have been proposed constant velocity universal joints of a track crossing type, which aim to achieve enhancement in efficiency and reduction in heat generation of the fixed type constant velocity universal joint capable of forming a large operating angle (Patent Document 1). This fixed type constant velocity universal joint includes an outer joint member, an inner joint member, a plurality of balls, and a cage. The outer joint member has a spherical inner peripheral surface in which a plurality of track grooves are formed so as to extend in an axial direction. The outer joint member has an opening side and a depth side spaced apart from each other in the axial direction. The inner joint member has a spherical outer peripheral surface in which a plurality of track grooves are formed so as to be paired with the track grooves of the outer joint member. The plurality of balls are interposed between the track grooves of the outer joint member and the track grooves of the inner joint member, and are configured to transmit torque. The cage is configured to retain the balls, and has a spherical outer peripheral surface to be fitted to the spherical inner peripheral surface of the outer joint member, and a spherical inner peripheral surface to be fitted to the spherical outer peripheral surface of the inner joint member. The track grooves of the outer joint member include first track groove portions located on the depth side, and second track groove portions located on the opening side. The first track groove portions each have an arc-shaped ball raceway center line having a curvature center that is prevented from being offset in the axial direction with respect to a joint center. Planes each include the ball raceway center line and the joint center that are inclined with respect to a joint axial line so that the planes are inclined in directions opposite to each other in the first track groove portions that are adjacent to each other in a circumferential direction. Each of the second track groove portions has a ball raceway center line having a straight part. The straight part is formed in an inclined manner to approach the joint axial line as approaching the opening side. An end portion of the ball raceway center line of each of the first track groove portions is located on the opening side with respect to the joint center. The ball raceway center line of each of the second track groove portions is connected to the end portion. A ball raceway center line of each of the track grooves of the inner joint member is formed so as to be mirror-image symmetrical with a ball raceway center line of corresponding one of the paired track grooves of the outer joint member with respect to a plane that includes the joint center at an operating angle of 0° (for example, claim 1 of Patent Document 1).

PRIOR ART DOCUMENTS

Patent Documents

Patent Document 1: JP 5840463 B2

SUMMARY OF THE INVENTION

Problems to be Solved by the Invention

With the above-mentioned configuration, the fixed type constant velocity universal joint in Patent Document 1 is suppressed in torque loss and heat generation, is enhanced in efficiency, is capable of forming a large operating angle, and is excellent in strength and durability at the large operating angle. In particular, the wedge angle between the straight track grooves at the large operating angle can be reduced, thereby being capable of securing the strength of the cage. Although the fixed type constant velocity universal joint in Patent Document 1 is extremely excellent as described above, focus is given to improvement for achieving higher-level performance.

In view of the above-mentioned improvement for achieving the higher-level performance, the present invention has an object to provide a compact fixed type constant velocity universal joint, which is suppressed in torque loss and heat generation, is enhanced in efficiency, is capable of forming a large operating angle, is excellent in balance of a wedge angle, a contact pressure, and an effective track length at the large operating angle, and is excellent in strength and durability.

Solution to the Problems

As a technical measure for achieving the above-mentioned object, according to one embodiment of the present invention, there is provided a fixed type constant velocity universal joint, comprising: an outer joint member having a spherical inner peripheral surface in which a plurality of track grooves are formed so as to extend in an axial direction, the outer joint member having an opening side and a depth side spaced apart from each other in the axial direction; an inner joint member having a spherical outer peripheral surface in which a plurality of track grooves are formed so as to be paired with the track grooves of the outer joint member; a plurality of balls, which are interposed between the track grooves of the outer joint member and the track grooves of the inner joint member, and are configured to transmit torque; and a cage, which is configured to retain the balls, and has a spherical outer peripheral surface to be fitted to the spherical inner peripheral surface of the outer joint member, and a spherical inner peripheral surface to be fitted to the spherical outer peripheral surface of the inner joint member, wherein the track grooves of the outer joint member comprise: first track groove portions ($7a$) located on the depth side; and second track groove portions ($7b$) located on the opening side, wherein the first track groove portions ($7a$) each have a ball raceway center line (Xa) having a single curvature radius (R1) with a curvature center that is prevented from being offset in the axial direction with respect to a joint center (O), wherein planes (M) each including the ball raceway center line (Xa) and the joint center (O) that are inclined with respect to a joint axial line (N-N) so that the planes (M) are inclined in directions opposite to each other in the first track groove portions (7a) that are adjacent to each other in a circumferential direction, wherein an end portion (A) of the ball raceway center line (Xa) of each of the first track groove portions (7a) is located on the opening side with respect to the joint center (O), wherein a ball raceway center line (Xb) of each of the second track groove portions (7b) is connected to the end portion (A), wherein a ball raceway center line (Y) of each of the track grooves of the inner joint member is formed so as to be mirror-image symmetrical with a ball raceway center line of corresponding one of the paired track grooves of the outer joint member with respect to a plane (P) that includes the joint center (O) at an operating angle of 0° and is orthogonal to the joint axial line (N-N), wherein the ball raceway center line (Xb) of the each of the second track groove portions (7b) has a single curvature radius (R2) with a curvature center that is offset in a radial direction with respect to the joint axial line (N-N), and wherein the curvature radius (R2) is set larger than the curvature radius (R1). The above-mentioned "joint axial line" herein refers to a longitudinal axial line that is a joint rotation center, and corresponds to a joint axial line N-N in the embodiment described later. The same applies to a joint axial line described in the claims.

With the configuration described above, there can be attained a compact fixed type constant velocity universal joint, which is suppressed in torque loss and heat generation, is enhanced in efficiency, is capable of forming a large operating angle, is excellent in balance of a wedge angle, a contact pressure, and an effective track length at the large operating angle, and is excellent in strength and durability. In particular, reduction in contact pressure between the ball and the second track groove portion brings about a remarkable effect in terms of performance (efficiency and durability) on the outer joint member with a large relative movement distance and a high velocity of the contact point between the torque transmitting ball and the track groove.

Specifically, it is preferred that a ratio R2/R1 of the curvature radius (R2) to the curvature radius (R1) be set in a range of from 3 to 10. With this, at the large operating angle, the size of the wedge angle of the second track groove portions 7b and 9b, the effective track length, and the contact pressure between each torque transmitting ball and the second track groove portions 7b and 9b can be balanced at a high level.

It is preferred that an angle (ß) formed by a straight line L connecting the joint center O and the end portion A on the opening side of the ball raceway center line Xa of the each of the first track groove portions 7a with respect to the plane P that includes the joint center O and is orthogonal to the joint axial line N-N be set to 5° to 8°. This is because, as the normal angle is set to 10°, it is essentially required that a lower limit of the angle ß be set to 5°. Meanwhile, an angle of 8° being an upper limit of the angle ß is verified based on a range of the ratio R2/R1, which is capable of securing the balance of the size of the wedge angle, the effective track length, and the contact pressure. The angle ß is herein defined as the smallest angle among the angles formed by the straight line L with respect to the straight line on the plane P, and the same applies to the embodiments and the claims.

The number of the above-mentioned torque transmitting balls is set to eight. With this, it is possible to attain a fixed type constant velocity universal joint and therefore an automotive drive shaft, which are lightweight and compact, are enhanced in efficiency, and are capable of a forming large operating angle.

Effects of the Invention

With the present invention, there can be attained a compact fixed type constant velocity universal joint, which is suppressed in torque loss and heat generation, is enhanced in efficiency, is capable of forming a large operating angle, is excellent in balance of a wedge angle, a contact pressure, and an effective track length at the large operating angle, and is excellent in strength and durability. In particular, reduction in contact pressure between the ball and the second track groove portion brings about a remarkable effect in terms of performance (efficiency and durability) on the outer joint member with a large relative movement distance and a high velocity of the contact point between the torque transmitting ball and the track groove.

BRIEF DESCRIPTION OF DRAWINGS

FIG. 4 is a partial longitudinal sectional view for illustrating the details of track grooves of the outer joint member of FIG. 2a.

FIG. 7b is a partially enlarged view of FIG. 7a.

EMBODIMENTS OF THE INVENTION

Figure 1A:
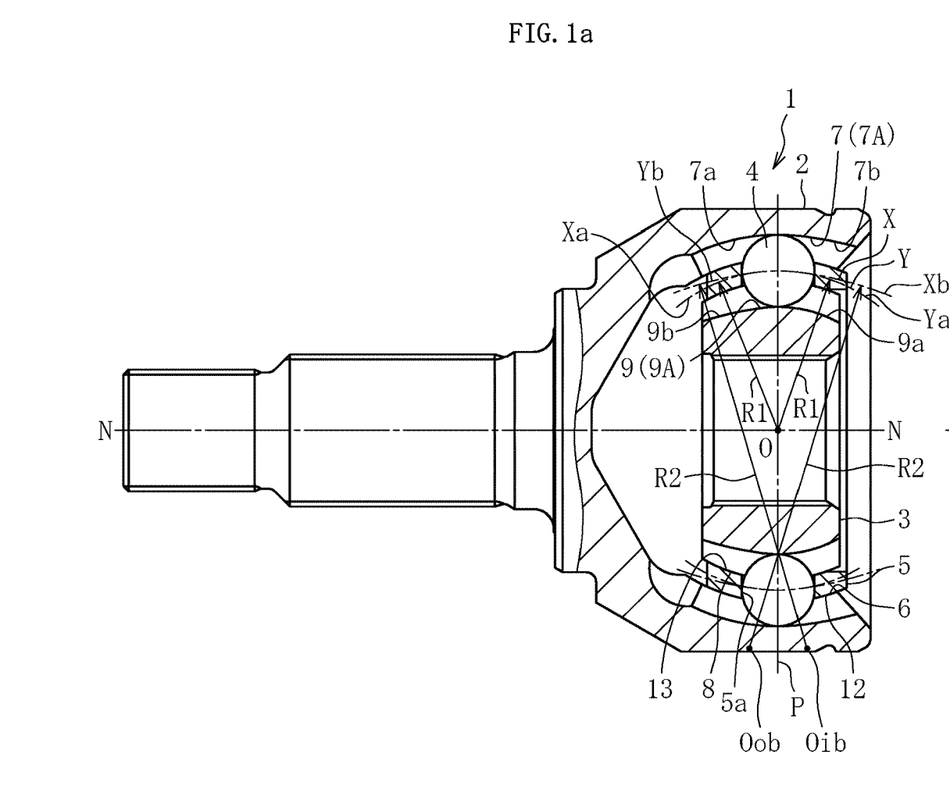
FIG. 1a is a partial longitudinal sectional view of a fixed type constant velocity universal joint according to one embodiment of the present invention.
Figure 1B:
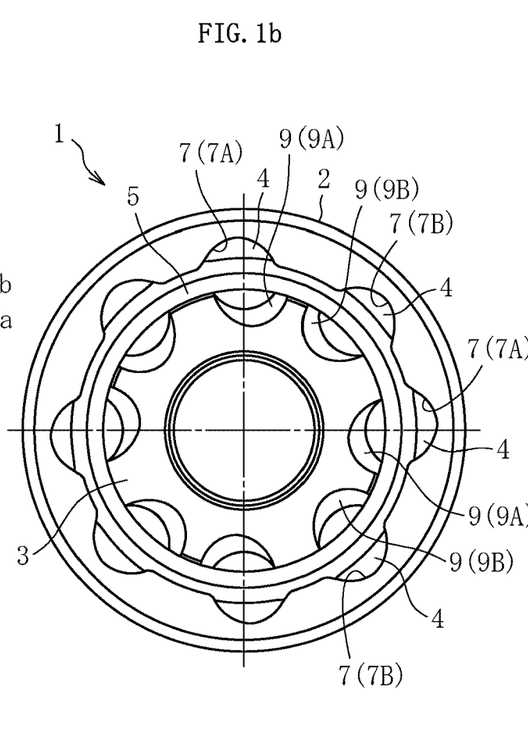
FIG. 1b is a side view of the fixed type constant velocity universal joint according to the one embodiment of the present invention.
Figure 2A:
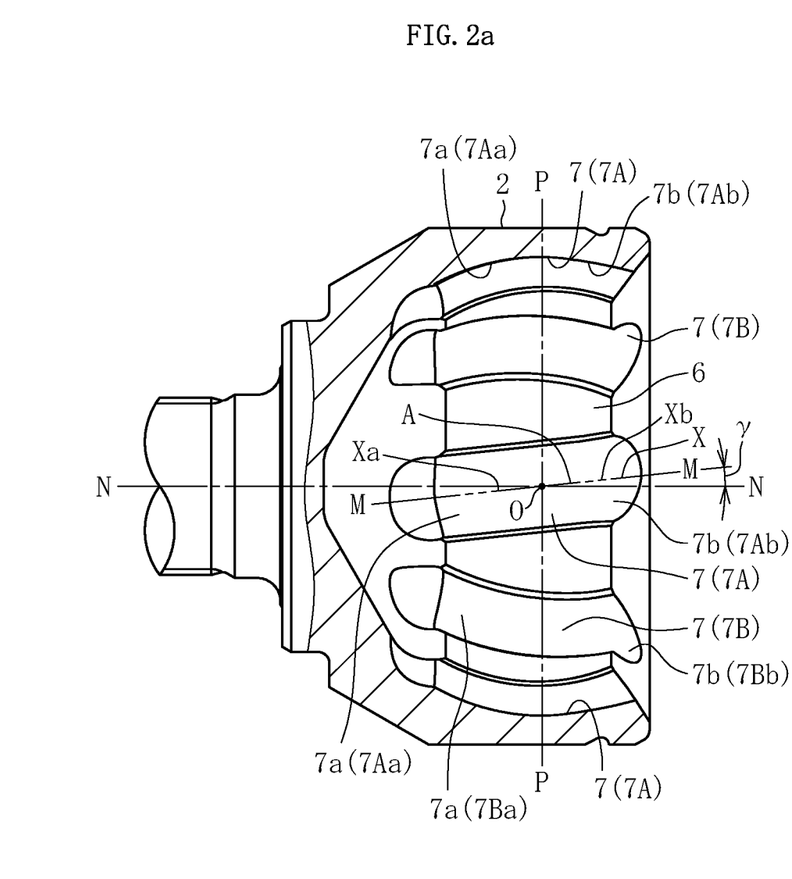
FIG. 2a is a partial longitudinal sectional view of an outer joint member of the fixed type constant velocity universal joint of FIG. 1.

One embodiment of the present invention is described with reference to FIG. 1 to FIG. 10. FIG. 1a is a partial longitudinal sectional view of a fixed type constant velocity universal joint according to this embodiment. FIG. 1b is a right side view. This constant velocity universal joint 1 mainly comprises an outer joint member 2, an inner joint member 3, balls 4, and a cage 5. As illustrated in FIG. 1b, FIG. 2, and FIG. 3, eight track grooves 7 of the outer joint member 2 comprise track grooves 7A and 7B that are inclined in a circumferential direction with respect to a joint axial line N-N so that the track grooves 7A and 7B adjacent to each other in the circumferential direction are inclined in directions opposite to each other. Further, eight track grooves 9 of the inner joint member 3 comprise track grooves 9A and 9B that are inclined in the circumferential direction with respect to the joint axial line N-N so that the track grooves 9A and 9B adjacent to each other in the circumferential direction are inclined in directions opposite to each other. In addition, eight balls 4 are arranged in crossing portions between the paired track grooves 7A and 9A and the paired track grooves 7B and 9B of the outer joint member 2 and the inner joint member 3. FIG. 1a is an illustration of the track grooves 7 and 9 under a state in which cross sections taken along a plane M illustrated in FIG. 2a and a plane Q illustrated in FIG. 3b are turned to an inclination angle γ of 0°. Detailed description of the track grooves 7 and 9 is given later.

FIG. 1a is an illustration of a longitudinal section of the joint. In order to precisely describe forms such as an inclined state and a curved state and a shape of the track grooves extending in an axial direction, the term "ball raceway center line" is used in this specification. The ball raceway center line herein refers to a track of a center of the ball that is arranged in the track groove at the time of moving along the track groove. Thus, the inclined state of the track groove corresponds to an inclined state of the ball raceway center line, and a state of an arc shape of the track groove corresponds to a state of an arc shape of the ball raceway center line.

As illustrated in FIG. 1a, the track groove 7 of the outer joint member 2 has a ball raceway center line X, and the track groove 7 comprises a first track groove portion 7a and a second track groove portion 7b. The first track groove portion 7a has a ball raceway center line Xa having a single curvature radius R1 with a curvature center that is prevented from being offset in the axial direction with respect to a joint center O. The second track groove portion 7b has a ball raceway center line Xb having a single curvature radius R2 with a curvature center Oob that is offset in a radial direction with respect to the joint axial line N-N. The curvature radius R2 is larger than the curvature radius R1. The ball raceway center line Xb of the second track groove portion 7b is smoothly connected, as a tangential line, to the ball raceway center line Xa of the first track groove portion 7a. Meanwhile, the track groove 9 of the outer joint member 3 has a ball raceway center line Y, and the track groove 9 comprises a first track groove portion 9a and a second track groove portion 9b. The first track groove portion 9a has a ball raceway center line Ya having a single curvature radius R1 with a curvature center that is not offset in the axial direction with respect to a joint center O. The second track groove portion 9b has a ball raceway center line Yb having a single curvature radius R2 with a curvature center Oib that is offset in a radial direction with respect to the joint axial line N-N. The curvature radius R2 is larger than the curvature radius R1. The ball raceway center line Yb of the second track groove portion 9b is smoothly connected, as a tangential line, to the ball raceway center line Ya of the first track groove portion 9a. The curvature center of each of the ball raceway center line Xa and Ya of the first track groove portions 7a and 9a is arranged at the joint center O, that is, on the joint axial line N-N. With this, depths of the track grooves can be equalized, and the track grooves can be easily processed.

Although not illustrated, the track grooves 7 and 9 are formed into an elliptical shape or a Gothic arch shape in transverse section, and the track grooves 7 and 9 are held in so-called angular contact with each ball 4 at a contact angle (approximately from 30° to 45°). Thus, the ball 4 is held in contact with side surface sides of the track grooves 7 and 9, which are slightly spaced apart from groove bottoms of the track grooves 7 and 9.

Figure 2B:
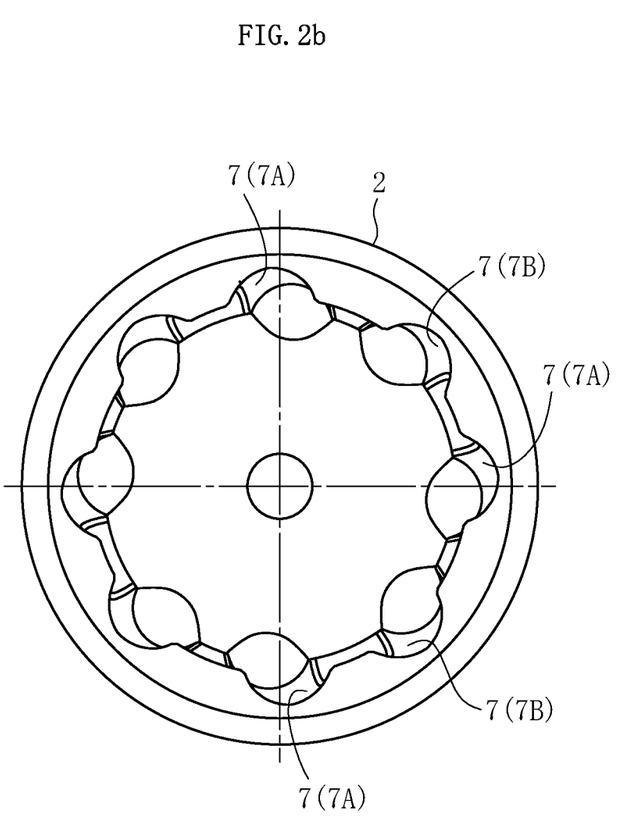
FIG. 2b is a side view of the outer joint member of the fixed type constant velocity universal joint of FIG. 1.
Figures 3A, 3B:
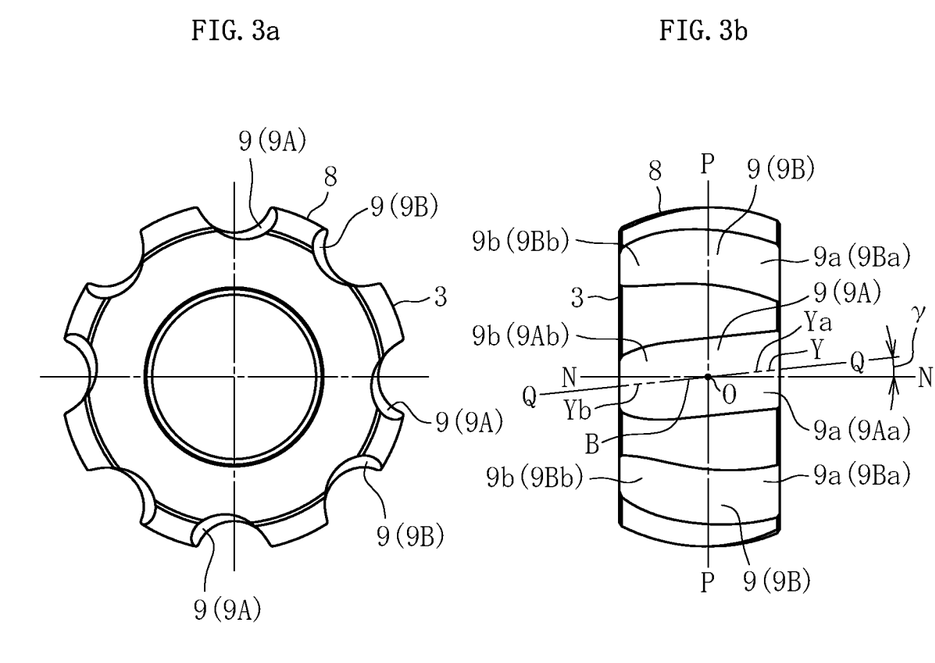
FIG. 3a is a left side view of an inner joint member of the fixed type constant velocity universal joint of FIG. 1.
FIG. 3b is a front view of the inner joint member of the fixed type constant velocity universal joint of FIG. 1.

With reference to FIG. 2, detailed description is given of a state in which the track grooves 7 of the outer joint member 2 are inclined in the circumferential direction with respect to the joint axial line N-N. FIG. 2a is a partial longitudinal sectional view of the outer joint member 2, and FIG. 2b is a right side view of the outer joint member 2. The track grooves 7 of the outer joint member 2 are denoted by the reference symbols 7A and 7B to indicate a difference in inclination direction thereof. As illustrated in FIG. 2a, a plane M including the ball raceway center line X of each track groove 7A and the joint center O is inclined at an angle γ with respect to the joint axial line N-N. In addition, in the case of each track groove 7B adjacent to the track groove 7A in the circumferential direction, although not illustrated, a plane M including the ball raceway center line X of the track groove 7B and the joint center O is inclined at an angle γ with respect to the joint axial line N-N in a direction opposite to the inclination direction of the track groove 7A.

Now, supplementary description is given of the reference symbols of the track grooves. The track grooves of the outer joint member 2 as a whole are denoted by the reference symbol 7. The first track groove portion is denoted by the reference symbol 7a. The second track groove portion is denoted by the reference symbol 7b. Further, the track grooves distinguished from each other based on the difference in inclination direction are denoted by the reference symbols 7A and 7B. First track groove portions of the respective track grooves 7A and 7B are denoted by reference symbols 7Aa and 7Ba. Second track groove portions of the respective track grooves 7A and 7B are denoted by reference symbols 7Ab and 7Bb. The track grooves of the inner joint member 3 described later are denoted by reference symbols in a similar manner.

Figure 3C:
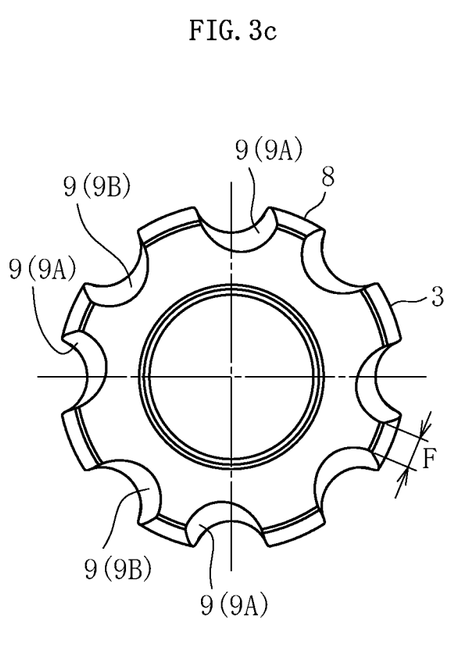
FIG. 3c is a right side view of the inner joint member of the fixed type constant velocity universal joint of FIG. 1.

With reference to FIG. 3, detailed description is given of a state in which the track grooves 9 of the inner joint member 3 are inclined in the circumferential direction with respect to the joint axial line N-N. FIG. 3b is an illustration of an outer peripheral surface of the inner joint member 3. FIG. 3a is an illustration of a left side surface of the inner joint member 3. FIG. 3c is an illustration of a right side surface. The track grooves 9 of the inner joint member 3 are denoted by the reference symbols 9A and 9B to indicate a difference in inclination direction thereof. As illustrated in FIG. 3b, a plane Q including the ball raceway center line Y of each track groove 9A and the joint center O is inclined at an angle γ with respect to the joint axial line N-N. In addition, in the case of each track groove 9B adjacent to the track groove 9A in the circumferential direction, although not illustrated, a plane Q including the ball raceway center line X of the track groove 9B and the joint center O is inclined at an angle γ with respect to the joint axial line N-N in a direction opposite to the inclination direction of the track groove 9A. It is preferred that the inclination angle γ be set to 4° to 12° in consideration of operability of the constant velocity universal joint 1 and a spherical width F between the closest sides of the track grooves of the inner joint member 3. The ball raceway center line Y of the track groove 9 of the inner joint member 3 is formed so as to be mirror-image symmetrical with the ball raceway center line X of the paired track groove 7 of the outer joint member 2 with respect to a plane P that includes the joint center O at an operating angle of 0° and is orthogonal to the joint axial line N-N.

Figure 4:
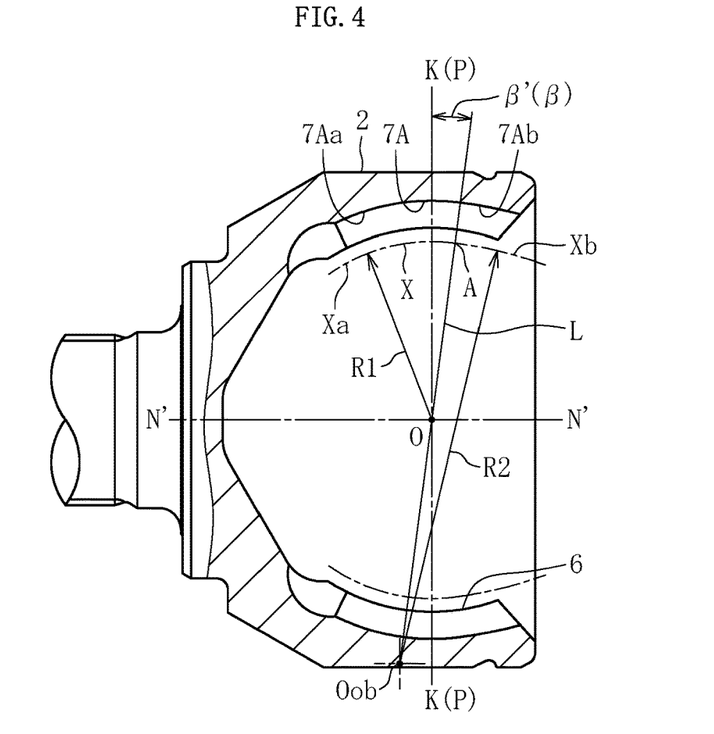

With reference to FIG. 4, detailed description is given of the track grooves as viewed in longitudinal section of the outer joint member 2. The partial longitudinal section of FIG. 4 corresponds to a sectional view taken along the above-mentioned plane M of FIG. 2a including the ball raceway center line X of the track groove 7A and the joint center O. Thus, in a strict sense, FIG. 4 is not a longitudinal sectional view taken along the plane including the joint axial line N-N, but is an illustration of a cross section inclined at the angle γ. In FIG. 4, the track groove 7A of the outer joint member 2 is illustrated, and the illustration and description of the track groove 7B are omitted because the inclination direction of the track groove 7B is opposite to that of the track groove 7A and other configurations of the track groove 7B are the same as those of the track groove 7A. A spherical inner peripheral surface 6 of the outer joint member 2 has the track grooves 7A formed along the axial direction. Each track groove 7A has the ball raceway center line X. The track groove 7A comprises the first track groove portion 7Aa and the second track groove portion 7Ab. The first track groove portion 7Aa has the ball raceway center line Xa having the single curvature radius R1 with a curvature center at the joint center O (with no offset in the axial direction). The second track groove portion 7Ab has the ball raceway center line Xb having the single curvature radius R2 with the curvature center Oob that is offset in the radial direction with respect to the joint axial line N-N (see FIG. 1a). The curvature radius R2 is larger than the curvature radius R1. In addition, the ball raceway center line Xb of the second track groove portion 7Ab is smoothly connected, as a tangential line, to an end portion A on an opening side of the ball raceway center line Xa of the first track groove portion 7Aa. That is, the end portion A is a connecting point between the first track groove portion 7Aa and the second track groove portion 7Ab. The end portion A is located on the opening side with respect to the joint center O, and hence the ball raceway center line Xb of the second track groove portion 7Ab that is connected, as a tangential line, to the end portion A on the opening side of the ball raceway center line Xa of the first track groove portion 7Aa is formed so as to approach the joint axial line N-N as approaching the opening side. Thus, it is possible to secure an effective track length at a maximum operating angle, and to suppress increase in wedge angle and contact pressure in a balanced manner.

As illustrated in FIG. 4, L represents a straight line connecting the end portion A and the joint center O. A joint axial line N'-N' projected onto the plane M including the ball raceway center line X of the track groove 7A and the joint center O (see FIG. 2a) is inclined at an angle γ with respect to the joint axial line N-N, and an angle formed between a perpendicular line K and the straight line L with respect to the joint center O on the axial line N'-N' is denoted by ß'. The above-mentioned perpendicular line K is formed in the plane P including the joint center O at the operating angle of 0°. Thus, an angle ß formed by the straight line L with respect to the plane P including the joint center O at the operating angle of 0° in the present invention satisfies a relationship of sin ß=sin ß'×cos γ.

Figure 5:
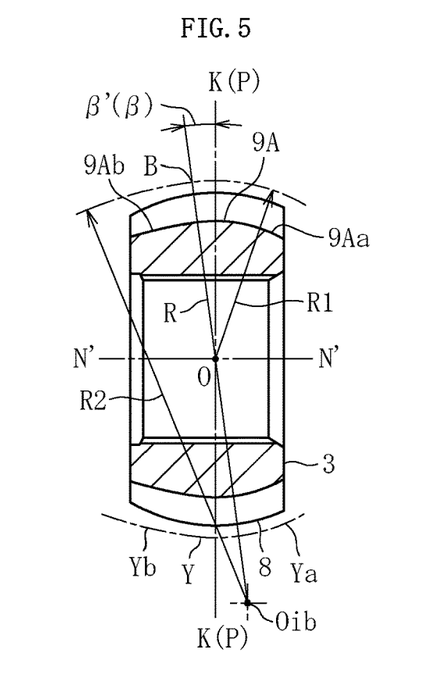
FIG. 5 is a longitudinal sectional view for illustrating the details of track grooves of the inner joint member of FIG. 3b.

Similarly, with reference to FIG. 5, detailed description is given of the track grooves as viewed in longitudinal section of the inner joint member 3. The longitudinal section of FIG. 5 corresponds to a sectional view taken along the above-mentioned plane Q of FIG. 3b including the ball raceway center line Y of the track groove 9A and the joint center O. Thus, in a strict sense, similarly to FIG. 4, FIG. 5 is not a longitudinal sectional view taken along the plane including the joint axial line N-N, but is an illustration of a cross section inclined at the angle γ. In FIG. 5, the track groove 9A of the inner joint member 3 is illustrated, and the illustration and description of the track groove 9B are omitted because the inclination direction of the track groove 9B is opposite to that of the track groove 9A and other configurations of the track groove 9B are the same as those of the track groove 9A. A spherical outer peripheral surface 8 of the inner joint member 3 has the track grooves 9A formed along the axial direction. Each track groove 9A has the ball raceway center line Y. The track groove 9A comprises the first track groove portion 9Aa and the second track groove portion 9Ab. The first track groove portion 9Aa has the ball raceway center line Ya having the single curvature radius R1 with a curvature center at the joint center O (with no offset in the axial direction). The second track groove portion 9Ab has the ball raceway center line Yb having the single curvature radius R2 with the curvature center Oib that is offset in the radial direction with respect to the joint axial line N-N. The curvature radius R2 is larger than the curvature radius R1. In addition, the ball raceway center line Yb of the second track groove portion 9Ab is smoothly connected, as a tangential line, to an end portion B on a depth side of the ball raceway center line Ya of the first track groove portion 9Aa. That is, the end portion B is a connecting point between the first track groove portion 9Aa and the second track groove portion 9Ab. The end portion B is located on the opening side with respect to the joint center O, and hence the ball raceway center line Yb of the second track groove portion 9Ab that is connected, as a tangential line, to the end portion B on the depth side of the ball raceway center line Ya of the first track groove portion 9Aa is formed so as to approach the joint axial line N-N as approaching the opening side. Thus, it is possible to secure an effective track length at a maximum operating angle, and to suppress increase in wedge angle and contact pressure in a balanced manner.

As illustrated in FIG. 5, R represents a straight line connecting the end portion B and the joint center O. A joint axial line N'-N' projected onto the plane M including the ball raceway center line X of the track groove 9A and the joint center Y (see FIG. 3b) is inclined at an angle γ with respect to the joint axial line N-N, and an angle formed between a perpendicular line K and the straight line L with respect to the joint center O on the axial line N'-N' is denoted by ß'. The above-mentioned perpendicular line K is formed in the plane P including the joint center O at the operating angle of 0°. Thus, an angle ß formed by the straight line L with respect to the plane P including the joint center O at the operating angle of 0° and being orthogonal to the joint axial line N-N satisfies a relationship of sin ß=sin ß'×cos γ.

Next, description is given of the angle @ formed by each of the straight lines L and R with respect to the plane P including the joint center O at the operating angle of 0° and being orthogonal to the joint axial line N-N. At an operating angle θ, each ball 4 moves by θ/2 with respect to the plane P including the joint center O in the outer joint member 2 and the inner joint member 3 and being orthogonal to the joint axial line N-N. The angle ß is determined based on ½ of a frequently used operating angle, and a contact range of the track groove for the ball 4 is determined within a range of the frequently used operating angle. Now, the frequently used operating angle is defined. First, the normal angle of the joint refers to an operating angle to be formed in a fixed type constant velocity universal joint of a front drive shaft of an automobile with one person onboard when the steering of the automobile is switched to a straightforward mode on a horizontal and flat road surface, and the normal angle of the joint is selected and determined in accordance with design conditions for vehicle types. In addition, the frequently used operating angle refers to an operating angle to be formed in the fixed type constant velocity universal joint of the above-mentioned automobile during, for example, continuous travel on a curved road, instead of a large operating angle to be formed at the time of, for example, right and left turns at a traffic intersection. This operating angle is slightly larger than the normal angle. In the process of the study for arriving at this embodiment, in consideration of vehicle layout or a travel state based on the normal angle, a frequently used operating angle being a reference for the angle ß could be narrowed down to 10°. With this, a lower limit of the angle ß was set to 5°.

In addition to the above-mentioned study to determine the lower limit value of the angle ß, focus was given to the setting range of the curvature radius R2 of the ball raceway center lines Xb and Yb of the second track groove portions 7b and 9b based on the angle ß, to thereby arrive at the embodiment of the present invention. Various verifications were conducted with evaluation items including a size of the wedge angle of the second track groove portions 7b and 9b, an effective track length, and a contact pressure between each torque transmitting ball and the second track groove portions 7b and 9b, at a large operating angle.

First, the wedge angle α of the second track groove portions 7b and 9b at the maximum operating angle $\theta_{max}$ (for example, 47°) was set to 22° to 24° based on proven data, and a dimensional setting of the curvature radius R2 of the ball raceway center lines Xb and Yb of the second track groove portions 7b and 9b, in other words, a ratio R2/R1 of the curvature radius R2 of the ball raceway center lines Xb and Yb of the second track groove portions 7b and 9b to the curvature radius R1 of the first track groove portions 7a and 9a was verified. Verification results of the ratio R2/R1 satisfying the above-mentioned wedge angle α=22° to 24° are shown in Table 1.

TABLE 1

| Angle ß | Ratio R2/R1 |
| --- | --- |
| 5° | 3.1 to 3.8 |
| 6° | 3.4 to 4.4 |
| 7° | 4.1 to 5.9 |
| 8° | 6.3 to 9.6 |
| 9° | 8.5 to 20.6 |
| 10° | 26.9 to 79.2 |

Next, a range of the angle ß is evaluated and verified with evaluation items including the size of the wedge angle of the second track groove portions 7b and 9b, the effective track length, and the contact pressure. The evaluation results are shown in Table 2.

TABLE 2

| Angle ß | 5° | 6° | 7° | 8° | 9° | 10° |
| --- | --- | --- | --- | --- | --- | --- |
| Wedge angle | ○ | ○ | ○ | ○ | ○ | ○ |
| Track length | ○ | ○ | ○ | ○ | ○ | Δ |
| Contact pressure | ○ | ○ | ○ | ○ | Δ | Δ |

[Evaluation results] ○: favorable, Δ: slightly poor

From the evaluation results of Table 1 and Table 2, it was verified that, when the range of the angle ß was from 5° to 8° and the range of the ratio R2/R1 was from 3 to 10, a balance of the size of the wedge angle, the effective track length, and the contact pressure at the large operating angle could be secured at a high level.

In FIG. 4, due to the above-mentioned angle ß, the end portion A of the ball raceway center line Xa of the first track groove portion 7Aa corresponds to a center position of the ball that is moved to the end of the opening side along the axial direction at the frequently used operating angle. Similarly, in FIG. 5 in the case of the inner joint member 3, the end portion B of the ball raceway center line Ya of the first track groove portion 9Aa corresponds to a center position of the ball that is moved to the end of the depth side along the axial direction at the frequently used operating angle. With this setting, within the range of the frequently used operating angles, the balls 4 are located between the first track groove portions 7Aa and 9Aa of the outer joint member 2 and the inner joint member 3 and between the first track groove portions 7Ba and 9Ba that are inclined in the opposite directions (see FIG. 2 and FIG. 3). Therefore, forces in opposite directions are applied from the balls 4 to pocket portions 5a of the cage 5 that are adjacent to each other in the circumferential direction, and hence the cage 5 is stabilized at the position of the joint center O (see FIG. 1). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation, and torque loss and heat generation are suppressed. As a result, the durability is enhanced.

Figure 6:
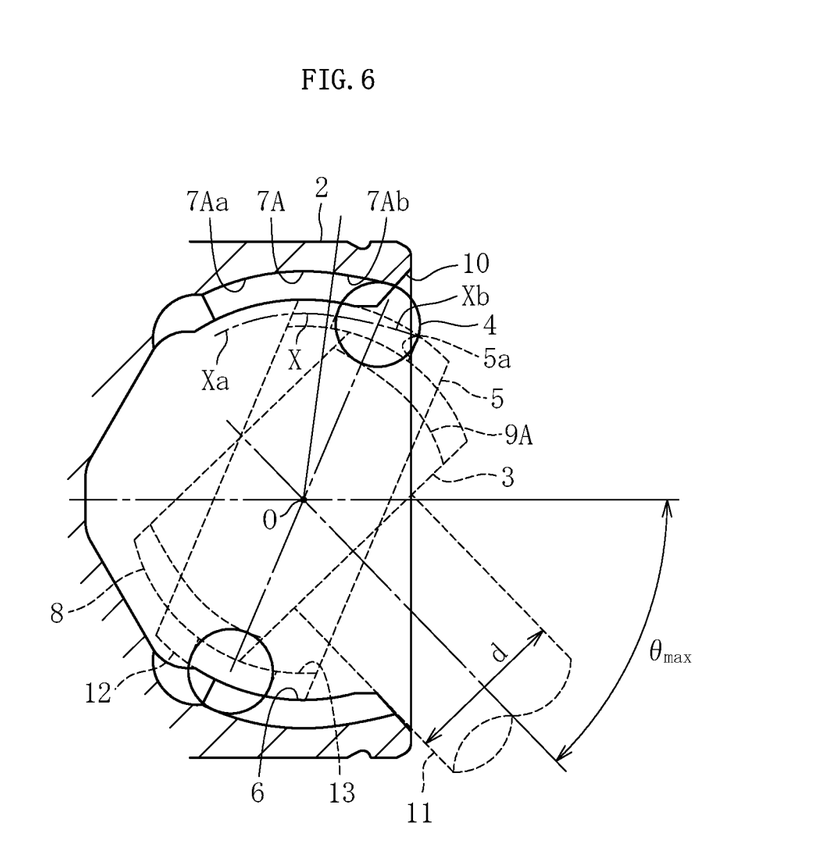
FIG. 6 is a schematic view for illustrating a state in which the joint forms a maximum operating angle.

FIG. 6 is an illustration of a state in which the constant velocity universal joint according to this embodiment forms the maximum operating angle. As described above, the ratio R2/R1 of the curvature radius R2 of the ball raceway center line Xb of the second track groove portion 7Ab to the curvature radius R1 of the ball raceway center line Xa of the first track groove portion 7Aa is set in a range of from 3 to 10. Therefore, the effective track length at the maximum operating angle can be secured, and increase in wedge angle and contact pressure can be suppressed in a balanced manner. Therefore, even when the maximum operating angle Omar is set as large as approximately 47° as illustrated in FIG. 6, the state of contact can be secured between the ball 4 and the second track groove portion 7Ab under a state in which an inlet chamfer 10 having a necessary and sufficient size is formed, and the increase in wedge angle and contact pressure can be suppressed.

In a range of large operating angles, the balls 4 arranged in the circumferential direction are temporarily positioned apart between the first track groove portions 7Aa and 9Aa (7Ba and 9Ba; see FIG. 2a and FIG. 3b) and between the second track groove portions 7Ab and 9Ab (7Bb and 9Bb; see FIG. 2a and FIG. 3b). Along with this, the forces applied from the balls 4 to the pocket portions 5a of the cage 5 are not balanced with each other, and hence the contact forces are generated between the spherical contact portions 12 and 6 of the cage 5 and the outer joint member 2 and between the spherical contact portions 13 and 8 of the cage 5 and the inner joint member 3, respectively. However, the angles in the range of large operating angles are used less frequently, and hence the constant velocity universal joint 1 according to this embodiment is comprehensively capable of suppressing the torque loss and heat generation. Thus, it is possible to attain a compact fixed type constant velocity universal joint, which is suppressed in torque loss and heat generation, is enhanced in efficiency, is capable of forming a large operating angle, and is excellent in strength and durability at the large operating angle.

Figure 7A:
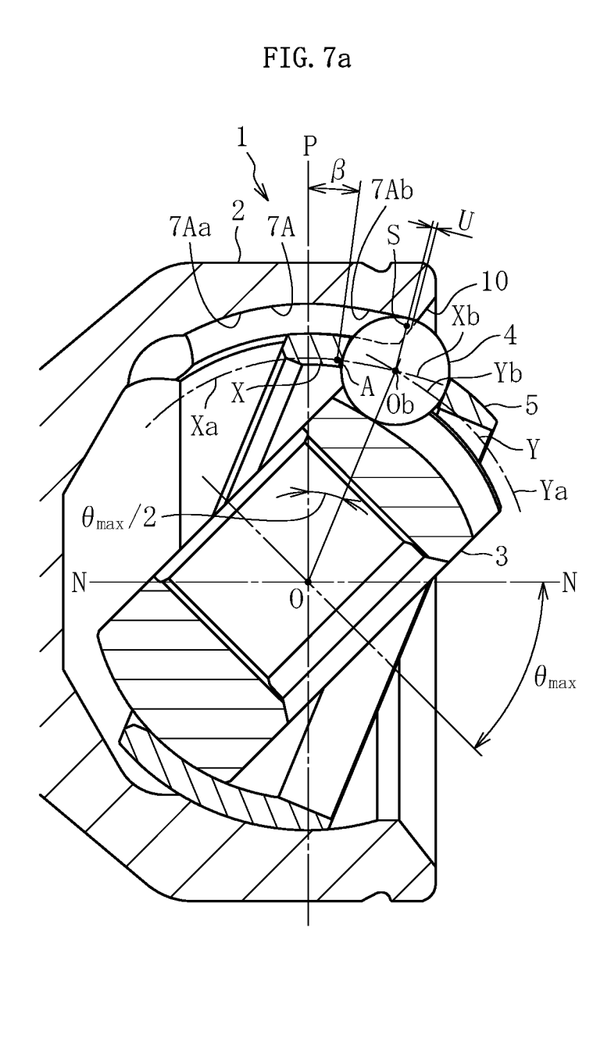
FIG. 7a is a longitudinal sectional view for illustrating a state of contact between a ball and the track grooves when the joint of FIG. 6 forms the maximum operating angle.
Figure 7B:
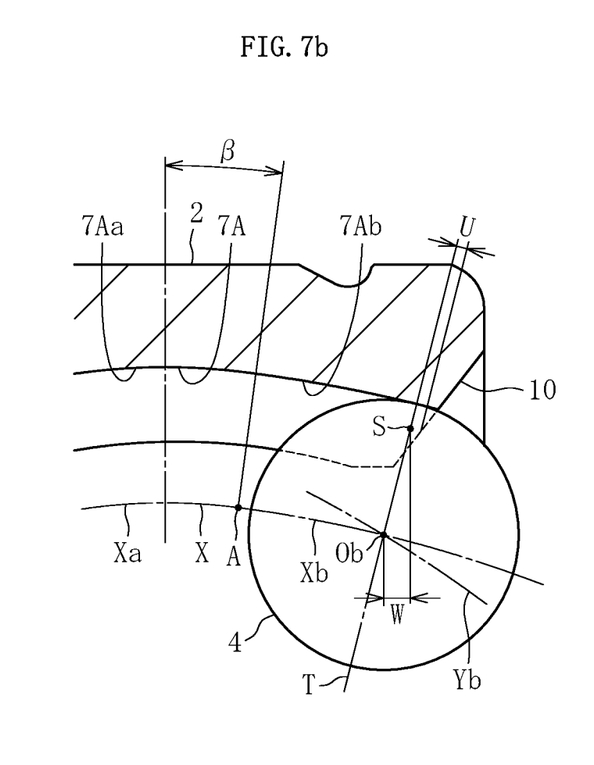

Further, with reference to FIG. 7, detailed description is given of the state of contact between the track groove and the ball at the time when the constant velocity universal joint 1 according to this embodiment forms the maximum operating angle. FIG. 7a is a longitudinal sectional view of the constant velocity universal joint 1, and FIG. 7b is an enlarged view for illustrating a state of contact between the track groove 7A of the outer joint member 2 and the ball 4. Also in FIG. 7a and FIG. 7b, the track groove 7A of the outer joint member 2 is illustrated, and the illustration and description of the track groove 7B are omitted because the inclination direction of the track groove 7B is opposite to that of the track groove 7A and other configurations of the track groove 7B are the same as those of the track groove 7A. When the joint forms the maximum operating angle $\theta_{max}$ as illustrated in FIG. 7a, a center Ob of the ball 4 is moved to a position of $\theta_{max}/2$ with respect to the plane P including the joint center O at the operating angle of 0°. At this time, a contact point S between the ball 4 and the second track groove portion 7Ab comes closest to the inlet chamfer 10. The ratio R2/R1 of the curvature radius R2 of the ball raceway center line Xb of the second track groove portion 7Ab to the curvature radius R1 of the ball raceway center line Xa of the first track groove portion 7Aa is set in the range of from 3 to 10. Thus, as illustrated in FIG. 7b in an enlarged manner, the contact point S between the ball 4 and the second track groove portion 7Ab is positioned in a plane T that passes through the center Ob of the ball 4 and is orthogonal to the ball raceway center line Xb. The ratio R2/R1 is set in the range of from 3 to 10. Thus, a distance W in the axial direction between the center Ob of the ball 4 and the contact point S is reduced, and the track length can be secured. Thus, in this embodiment, at the maximum operating angle, a track allowance amount U can be secured between an edge portion of the inlet chamfer 10 and the contact point So, and hence a sufficient state of contact can be secured between the ball 4 and the track groove portion 7Ab.

Figure 8:
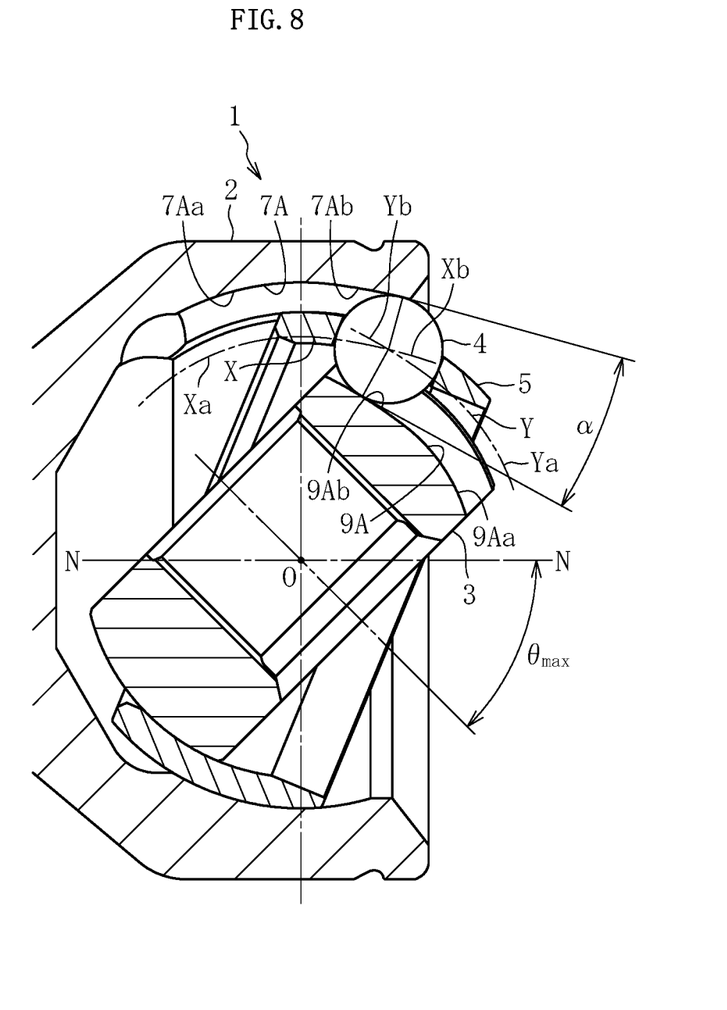
FIG. 8 is a view for illustrating a wedge angle in the state in which the joint forms the maximum operating angle.

Further, the ratio R2/R1 of the curvature radius R2 of the ball raceway center line Xb of the second track groove portion 7Ab to the curvature radius R1 of the ball raceway center line Xa of the first track groove portion 7Aa is set in the range of from 3 to 10. Therefore, as illustrated in FIG. 8, the wedge angle α when the constant velocity universal joint 1 according to this embodiment forms the maximum operating angle is suppressed to a proven level. In particular, in this embodiment, reduction in contact pressure between the ball 4 and the second track groove portion 7b brings about a remarkable effect in terms of performance (efficiency and durability) on the outer joint member 2 with a large relative movement distance and a high velocity of the contact point between the torque transmitting ball 4 and the track groove 7.

Figure 9A:
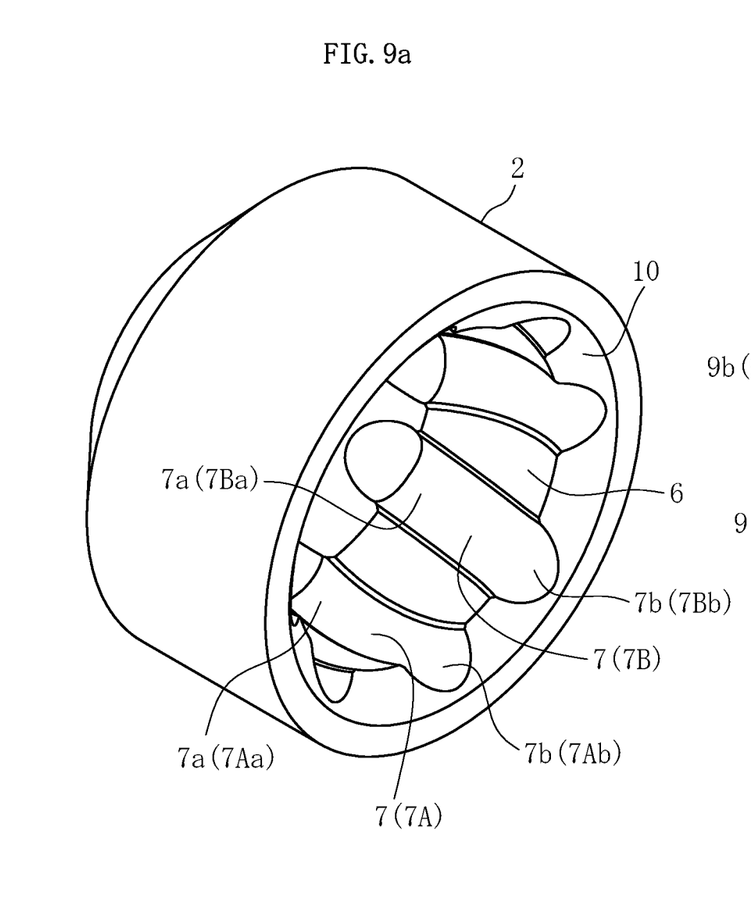
FIG. 9a is a perspective view of the outer joint member.
Figure 9B:
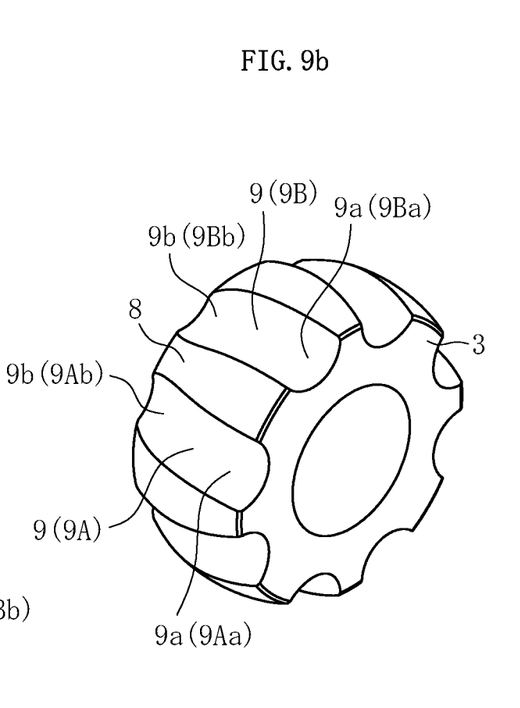
FIG. 9b is a perspective view of the inner joint member.

FIG. 9 are perspective views of the outer joint member 2 and the inner joint member 3 of the constant velocity universal joint according to this embodiment. Those perspective views are illustrations of the above-mentioned track grooves in a three-dimensional manner. As illustrated in FIG. 9a, the track grooves 7A and 7B inclined in the circumferential direction with respect to the joint axial line N-N (not shown) are alternately formed in the spherical inner peripheral surface 6 of the outer joint member 2 so that the track grooves 7A and 7B are inclined in directions alternately opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is formed at the opening end of the outer joint member 2. Further, as illustrated in FIG. 9b, the track grooves 9A and 9B inclined in the circumferential direction with respect to the joint axial line N-N (not shown) are alternately formed in the spherical outer peripheral surface 8 of the inner joint member 3 so that the track grooves 9A and 9B are inclined in directions alternately opposite to each other. Each track groove 9A comprises the first track groove portion 9Aa and the second track groove portion 9Ab, and each track groove 9B comprises the first track groove portion 9Ba and the second track groove portion 9Bb.

Figure 10:
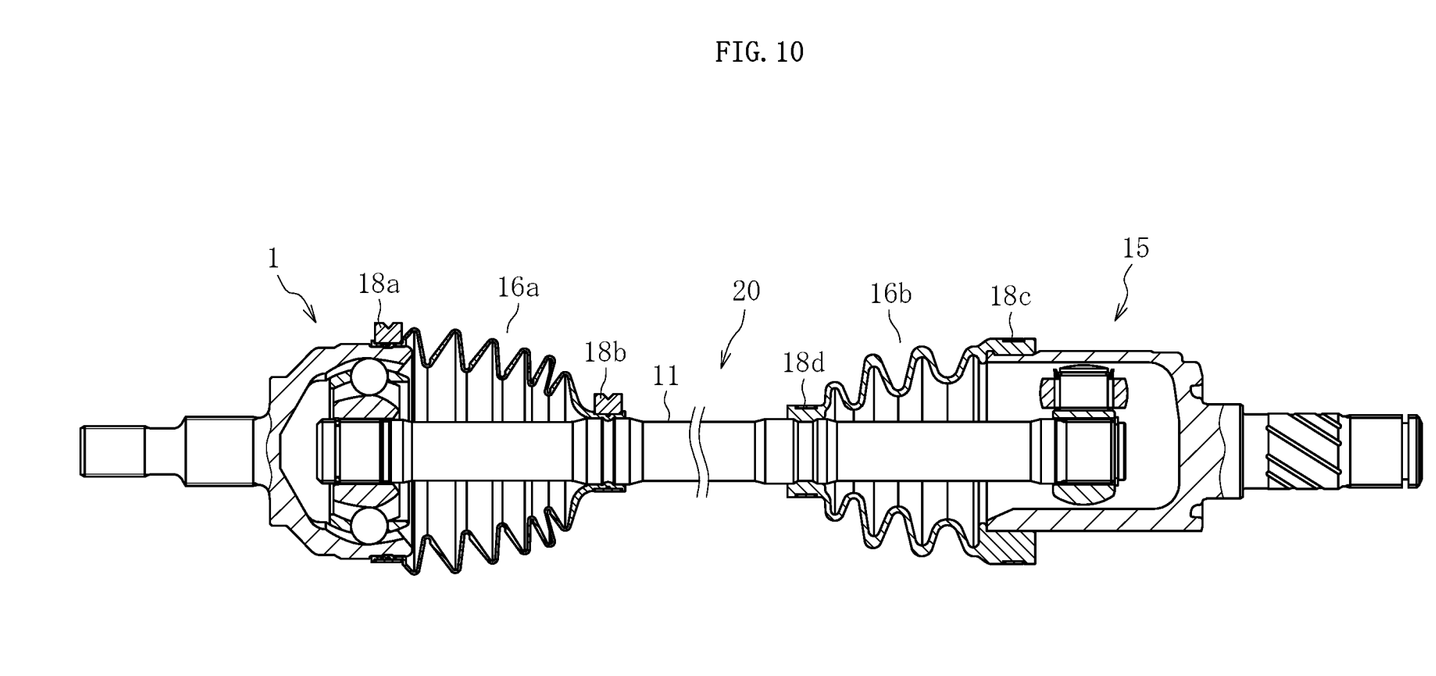
FIG. 10 is a view for illustrating a state in which the fixed type constant velocity universal joint of FIG. 1a is used for an automotive drive shaft.

FIG. 10 is an illustration of an automotive front drive shaft 20, to which the fixed type constant velocity universal joint 1 according to this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are mounted and fixed with boot bands 18a, 18b, 18c, and 18d, respectively. Grease is sealed inside the joint as a lubricant. Through use of the fixed type constant velocity universal joint 1 according to this embodiment, it is possible to attain a lightweight and compact automotive drive shaft 20, which is suppressed in torque loss and heat generation, is enhanced in efficiency, and is capable of forming a large operating angle.

In the fixed type constant velocity universal joint according to the embodiment described above, the number of the balls 4 is eight. However, the present invention is not limited thereto. Ten to twelve balls may also be suitably applicable.

Further, in the fixed type constant velocity universal joint according to the above-mentioned embodiment, the track grooves and the balls are held in angular contact at a contact angle. However, the present invention is not limited thereto. The track grooves may be formed into a circular shape in transverse section so that the track grooves and the balls are held in circular contact.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove 9b second track groove
11 shaft
12 spherical outer peripheral surface
13 spherical inner peripheral surface
20 drive shaft
A end portion
B end portion
K perpendicular line
L straight line
M plane including ball raceway center line
N joint axial line
O joint center
Oob curvature center
Oib curvature center
P joint center plane
Q plane including ball raceway center line
R straight line
R1 curvature radius
R2 curvature radius
X ball raceway center line
Y ball raceway center line
γ inclination angle
ß angle
θ operating angle

The invention claimed is:

1. A fixed type constant velocity universal joint, comprising:
an outer joint member having a spherical inner peripheral surface in which a plurality of track grooves are formed so as to extend in an axial direction, the outer joint member having an opening side and a depth side spaced apart from each other in the axial direction;
an inner joint member having a spherical outer peripheral surface in which a plurality of track grooves are formed so as to be paired with the track grooves of the outer joint member;
a plurality of balls, which are interposed between the track grooves of the outer joint member and the track grooves of the inner joint member, and are configured to transmit torque; and
a cage, which is configured to retain the balls, and has a spherical outer peripheral surface to be fitted to the spherical inner peripheral surface of the outer joint member, and a spherical inner peripheral surface to be fitted to the spherical outer peripheral surface of the inner joint member,
wherein the track grooves of the outer joint member comprise:
first track groove portions (7a) located on the depth side; and
second track groove portions (7b) located on the opening side,
wherein the first track groove portions (7a) each have a first ball raceway center line (Xa) having a first single curvature radius (R1) with a curvature center that is prevented from being offset in the axial direction with respect to a joint center (O),
wherein first planes (M) each including one of the first ball raceway center lines (Xa) and the joint center (O) are inclined with respect to a joint axial line (N-N) such that the first planes of the first track groove portions (7a) that are adjacent to each other in a circumferential direction are inclined in directions opposite to each other,
wherein an end portion (A) of the first ball raceway center line (Xa) of each of the first track groove portions (7a) is located on the opening side with respect to the joint center (O),
wherein a second ball raceway center line (Xb) of each of the second track groove portions (7b) is connected to the end portion (A) of one of the first ball raceway center lines (Xa),
wherein a ball raceway center line (Y) of each of the track grooves of the inner joint member is formed so as to be mirror-image symmetrical with a ball raceway center line (X) formed by one of the first ball raceway center lines (Xa) and one of the second ball raceway center lines (Xb) of a corresponding one of the track grooves of the outer joint member with respect to a second plane (P) that includes the joint center (O) at an operating angle of 0° and is orthogonal to the joint axial line (N-N),
wherein the second ball raceway center line (Xb) of each of the second track groove portions (7b) has a second single curvature radius (R2) with a curvature center that is offset in a radial direction from the joint axial line (N-N) such that the second single curvature radius (R2) intersects the joint axial line (N-N), and
wherein the second single curvature radius (R2) is set larger than the first single curvature radius (R1).

2. The fixed type constant velocity universal joint according to claim 1, wherein an angle ((3) formed by a straight line (L) connecting the joint center (O) and the end portion (A) on the opening side of the first ball raceway center line (Xa) of one of the first track groove portions (7a) with respect to the second plane (P) that includes the joint center (O) and is orthogonal to the joint axial line (N-N) is set to 5° to 8°.

3. The fixed type constant velocity universal joint according to claim 2, wherein the plurality of balls is eight balls.

4. The fixed type constant velocity universal joint according to claim 1, wherein the plurality of balls is eight balls.

* * * * *